United States Patent Office 2,910,660
Patented Oct. 27, 1959

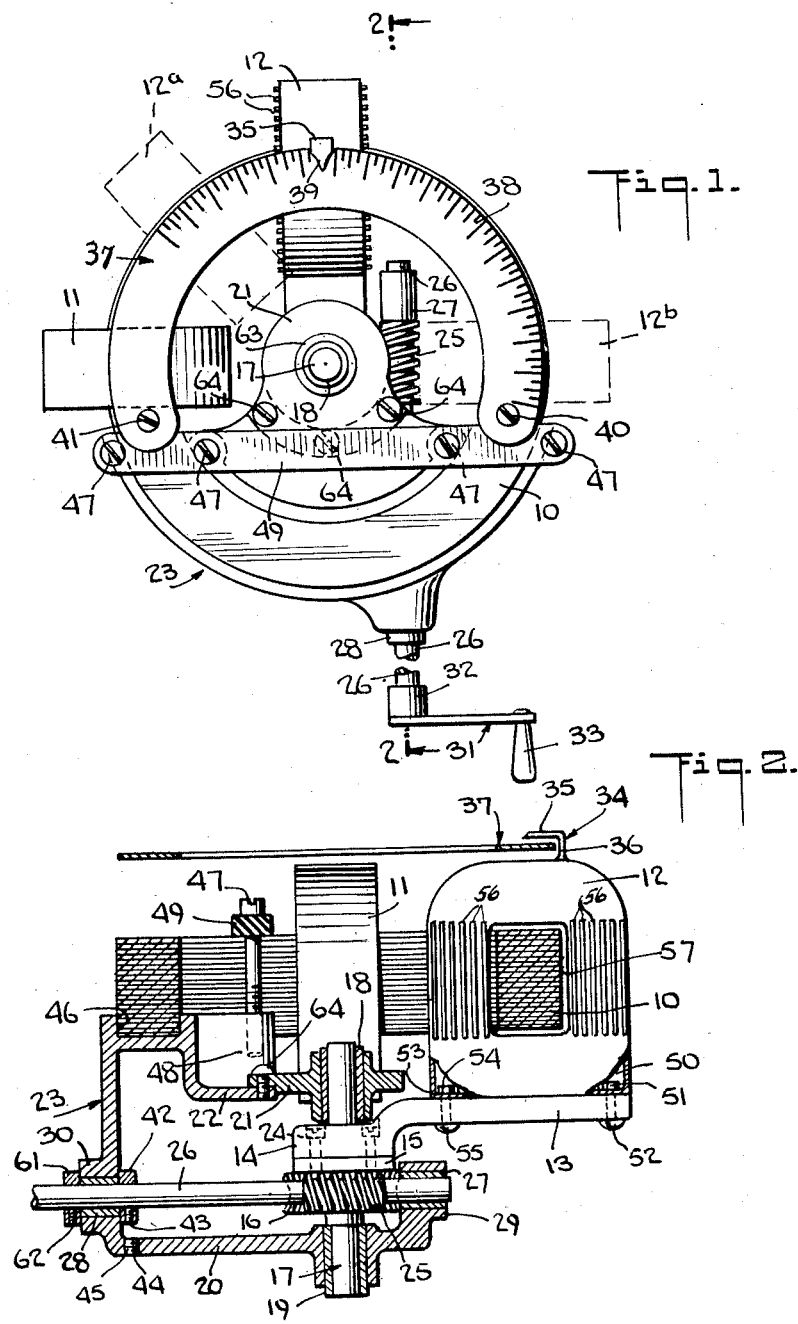

2,910,660
WELDING TRANSFORMERS

Ronald Frederick Brennen and James Arthur Bucci, Brooklyn, N.Y., assignors to Welding Industry Research and Patent Corporation, a corporation of New York Application June 29, 1955, Serial No. 518,772

3 Claims. (Cl. 336—120)

This invention relates to improvements in transformers, and is directed more particularly to welding transformers having windings on toroidal cores, one of the windings being fixed and the other being movable toward and away from the first winding and carrying part of a visual indicator by means of which a desired setting or coupling, in accordance with the type of work to be done, is effected.

Another object of the invention is the provision of a welding transformer having an annular or toroidal core, a fixed primary carried on said core in embracing relation therewith, and a secondary also embracing said core mounted for rotation about said core so that the distance from, and the relation of said secondary may be accurately set to a desired position relative to the primary, the means for moving the secondary being of the "irreversible type" so that the secondary remains in any setting until moved away from its set position in either direction.

Another object of the invention is the provision, in a welding transformer, of a toroidal core, a primary embracing said core and fixed thereon. A secondary winding embracing said core and movable along said core relative to said primary, and a visual indicator partially carried by said secondary and partially carried on said core, enabling the user to set the transformer for different types of service and regulation.

Other objects and advantages of the invention will be apparent to those skilled in the art from a study of this specification and the accompanying drawings.

Referring to the drawings which are given by way of example to illustrate the invention:

Figure 1 is a plan view of a transformer embodying the invention;

Figure 2 is an elevation, partly in section, and taken along the line 2—2 of Figure 1 showing other features of said transformer.

Figure 3:
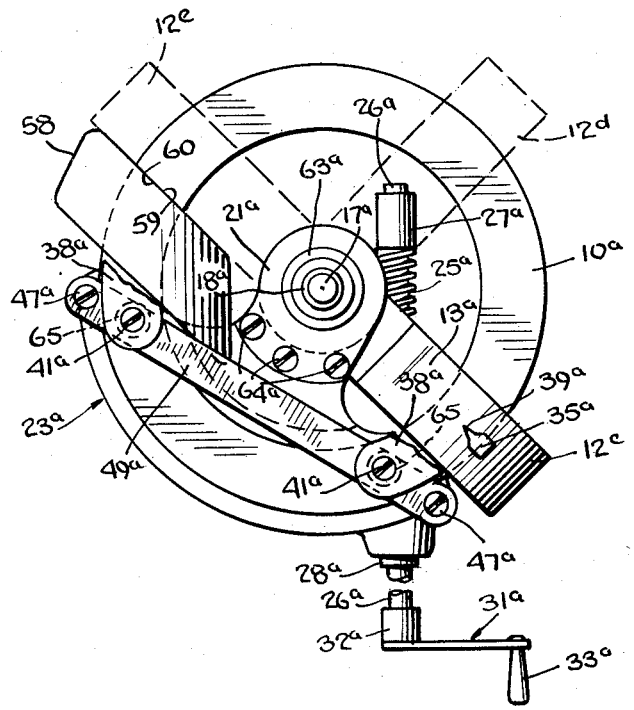
Figure 3 is a view similar to Figure 1 and constituting a modified form of the arrangement shown in Figure 1.

Referring first to Figures 1 and 2, a ferrous core 10 is in the form of a ring and may be "wound" of soft iron or steel. Wound upon the core 10 is a primary winding 11 which closely embraces the core 10 and is preferably secured on the core so as to be stationary thereon, and this winding 11 is connected to a source of alternating current (not shown). Also carried on the core 10 is a secondary winding 12. The winding 12 is mounted on an arm 13 which has a hub portion 14 which is in turn secured to the hub portion 15 of a worm gear 16. The worm gear 16 is carried on a vertical shaft 17 which is journaled in aligned bearings 18 and 19. The bearing 19 is carried in a main base casting 20 while the bearing 18 is carried in the semi-end plate 21 which is mounted on upper wall 22 of the main casing 23 and secured thereon by screws 64. The hub 14 is secured to the hub 15 of the worm gear by means of cap screws 24 so that when the worm gear 16 is rotated, the secondary winding 12 is moved by the arm 13 to various points around the core 10 between the positions 12a and 12b.

For rotating the worm gear 16, a worm 25 meshing with the worm gear 16 is carried on shaft 26 which is journaled in aligned bearings 27 and 28. The bearing 27 is carried in a boss 29 near the bushing 19, while the bearing 28 is carried in a boss 30 in the left end wall of the casing 23 as seen in Figure 2, and the shaft 26 has a crank arm 31 on its outer extremity which is comprised of a hub 32 secured directly on the shaft 26 and a handle 33 per se on the outer end of the crank arm 31.

The secondary winding has a pointer 34 which forms one leg 35 of a U-shaped member 36. This member 36 is secured on the upper surface of the secondary winding and the portion 35 overhangs an arcuate ring 37 which is rigidly mounted on the core 10 by means of screw posts 40 and 41, and the upper surface of the element 37 carries calibrations 38 which are traversed by a pointer tip 39 of the portion 35. The operator in using the transformer, which is the subject of the present application, may readily set the secondary winding relative to the first or primary winding by rotating the crank 31 in either direction until the pointer 39 is positioned over the desired current indication on the scale 38. The shaft 26 has a collar 42 which is secured thereto by means of a set screw 43 accessible through a hole 44 in the base 20 after a plug 45 therein is removed.

The collar 42 bears against the inner end of the bushing 28, and a second collar 61 is secured on the shaft 26 by means of a set screw 62 and it bears against the outer end of the bearing bushing 28 and substantially eliminates any backlash so that any settings of the position of the secondary 12, as will hereinafter be described, may be extremely accurate and consequently in accordance with the graduations or calibrations 38.

The main casing 23 has an arcuate groove 46 into which a portion of the toroidal ring 10 is positioned and it is secured therein by means of a series of screws 47, details of one of which are shown in Figure 2, wherein the screw engages a threaded hole in a boss 48 after passing through a bridging strip 49, which is preferably made of a non-ferrous material.

The secondary winding 12 may be mounted on the arm 13 in a mechanically stable and rigid manner, for example, by providing the secondary winding with a molding 50 containing a metal insert 51 having a threaded hole therein and engaged by a screw 52 passing through the arm 13. The molding 50 has two of the inserts 51 spaced apart from each other and as the secondary is mounted the screws 52 pass through holes in the arm 13 spaced apart the same as the spaces of the threaded holes in the inserts 51. A similar molding 53 is secured to the secondary winding on the other side and this molding also has inserts 54 like those shown in 51, each containing a threaded hole engaged by a screw 55. The secondary has radiating fins 56 between the convolutions of the windings and projecting from the surface of the secondary winding so that the heat that they pick up may be disposed of by rising air currents in the air immediately about the secondary winding and thereby the secondary is cooled. Within the secondary winding sufficient space 57 is provided between the winding 12 and the core to permit the secondary winding to be moved freely along the core 10. In a modified form of the device such as that shown in Figure 3, a toroidal core 10a may be provided with a secondary winding 12c and which is movable from the position 12c to other positions nearer to the primary (which will presently be described) for example, to the position 12d which is intermediate the maximum and minimum current positions and to the position 12e which is the position for maximum current. The primary winding 58 is somewhat trapezoid in form and the side 59 thereof is parallel to the side 60 of the secondary when the latter is in the position shown at 12c. This means that when the secondary is in the position shown at 12c, it is influenced by the primary winding 58 to a maximum degree, and consequently the greatest possible regulation is obtained in the secondary as it is moved from the position 12e to the position shown at 12c.

In Figure 3, the casing 23a is similar to the casing 23 except as hereinafter pointed out. The secondary is mounted for rotation on an arm 13a which is substantially the same as the arm 13, and this arm has a hub (not shown in Figure 3) which is substantially identical with the hub 14 in Figure 2. A worm gear is identical with the worm gear 16 which is shown in Figure 2 and is carried on a worm shaft 26a which is identical with the shaft 26, and it carries a worm 25a, identical with the worm 25, and it is journaled in aligned bearings 27a, 28a, identical with the bearings 27 and 28 shown in Figure 2 so that by means of the crank 31a, which is identical with the crank 31, the secondary winding 12c may be moved to any position though an arc of substantially 180 degrees to the position 12e, and due to the worm-worm gear arrangement, the secondary winding is not moved by the attraction and repulsion of the magnetic lines of force, and can only be moved through the medium of the worm and worm gear. The worm gear shaft 17 is journaled in aligned bearings 18 and 19 in the same manner as shown in Figure 2, one of the bearings being shown in Figure 3 as 18a, and this shaft has its axis extending vertically. The bearing 18a is pressed into a hole formed in a boss 63a which is carried in a semi-end plate 21a, and the end plate 21a is secured on the upper wall 22a of the main casing 23a. The visual indicator 38a on the arcuate element 37 is similar to the indicator 38, however in Figure 3 the element 37 is broken away so that details of the primary and secondary windings may be seen more clearly. The annular core 10a is set into an arcuate groove formed in the main casing 23a and is secured therein by means of a non-metallic bridge member 49a which is very similar to the bridge member 49 shown in Figures 1 and 2 and the screws 47a on each end are employed to clamp the core onto the main casing 23a. It will also be noted that the screws 41a for supporting the visual indicator 37a, 38a are each screwed directly into a post 65, which is in turn secured on the bridge member 49a, and the secondary winding 12c carries an element 35a which has a pointer 39a that traverses the calibrations 38a.

When the secondary is moved to the position indicated at 12e, it is in contact with one side 59 of the primary winding 58, where the maximum transfer of energy between the windings is effected, and the secondary may be moved to a position substantially 180° away, and the transfer of energy between the coils is entirely through the core, since the secondary is too far away from the primary for induction currents of any appreciable extent, to be produced. This arrangement therefore provides a wide range of adjustability and the efficiency of the arrangement is quite high due to the fact that the windings are carried on a toroidal core (which has the shortest magnetic path of any type of core).

As a modification of the arrangement of fins such as those shown at 56 in the drawings, we contemplate deforming the copper ribbon or other metallic strip with which the secondary winding is wound by impressing therein a series of opposed apices which somewhat resemble a sine wave before the secondary is wound thereby providing a series of passages for air to pass through the winding for the purpose of removing a greater percentage of the heat generated. To give some idea of the size of the heights of these apices, each apex may be of a height of between fifteen and sixty-five thousandths of an inch. However, we do not wish to be limited to the exact sizes given since it will depend to a great degree on space limitations.

Although we have herein shown and described by way of example one embodiment of a welding transformer having a toroidal core and means for moving one of the windings relative to the other, many changes may be made in the arrangement shown and described within the scope of the following claims.

We claim:

1. In a welding transformer, an annular toroidal core generally rectangular in cross-section, a primary winding embracing said core and immovably fixed thereon, a secondary winding embracing said core with sufficient clearance to enable it to be moved freely therealong on an arcuate path having an axis coinciding with the axis of said core, mechanical means to move said secondary along said core as aforesaid, said last means being adapted to remain in any adjusted position, a base or support for said core, said base having groove means therein for accurately locating said core thereon, means bridging said core and having screws engaging said support for retaining said core thereon.

2. In a welding transformer, an annular toroidal core generally rectangular in cross-section, a primary winding about said core and immovably fixed thereon, a secondary winding embracing said core with sufficient clearance to enable it to be moved freely therealong from a position adjacent to said primary to a position substantially spaced apart therefrom, a base or support for said core, said base having groove means therein for accurately locating said core thereon, means bridging said core and having screws engaging said support for retaining said core on said base, mechanism including a cooperating worm and worm gear, an arm moved thereby, means securing said secondary on said arm so that accurate settings of the space relation of the secondary to the primary may be made by said mechanism.

3. In a welding transformer, an annular toroidal core generally rectangular in cross-section, a primary winding about said core immovably fixed thereon, said winding being somewhat trapezoidal in form and having an angular face, a secondary winding embracing said core with sufficient clearance to enable it to be moved freely therealong on an arcuate path, said secondary having one face adapted to contact said first face in one of its extreme positions, a base or support for said core, said base having groove means therein for accurately locating said core thereon, means bridging said core and having screws extending downwardly to engage said support for retaining said core on said base, mechanism including a cooperating worm and worm gear, an arm moved thereby, means securing said secondary on said arm so that accurate settings of the space relation of the secondary to the primary may be made at will by an operator.

References Cited in the file of this patent

UNITED STATES PATENTS

| 1,477,822 | Greenwald | Dec. 18, 1923 |
| 1,683,389 | Koehni | Sept. 4, 1928 |
| 2,175,039 | Soulary | Oct. 3, 1939 |
| 2,475,044 | Mulder | July 5, 1949 |
| 2,544,845 | Link | Mar. 13, 1951 |
| 2,710,947 | Gaston | June 14, 1955 |